United States Patent
Naitou

(10) Patent No.: US 10,899,018 B2
(45) Date of Patent: Jan. 26, 2021

(54) HUMAN-COLLABORATIVE ROBOT

(71) Applicant: FANUC CORPORATION, Yamanashi (JP)

(72) Inventor: Yasuhiro Naitou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 277 days.

(21) Appl. No.: 15/695,140

(22) Filed: Sep. 5, 2017

(65) Prior Publication Data

US 2018/0065256 A1    Mar. 8, 2018

(30) Foreign Application Priority Data

Sep. 8, 2016 (JP) .................................. 2016-175821

(51) Int. Cl.
*B25J 13/08* (2006.01)
*F16P 3/12* (2006.01)
(Continued)

(52) U.S. Cl.
CPC ............ *B25J 13/085* (2013.01); *B25J 9/1676* (2013.01); *B25J 19/06* (2013.01); *F16P 3/12* (2013.01);
(Continued)

(58) Field of Classification Search
CPC ........ B25J 13/085; B25J 9/1676; B25J 19/06; B25J 13/08; F16P 3/12; G01L 5/0076;
(Continued)

(56) References Cited

U.S. PATENT DOCUMENTS 5,929,585 A * 7/1999 Fujita .................. B62D 57/032
  318/568.11
6,177,776 B1 * 1/2001 Kawai .................... B25J 13/085
  180/8.1
(Continued)

FOREIGN PATENT DOCUMENTS

DE 102014019035 A1 6/2015
DE 102014207275 A1 10/2015
(Continued)

OTHER PUBLICATIONS

Machine Translation of JP2001157985 (Year: 2001).*
(Continued)

*Primary Examiner* — Jason Holloway
(74) *Attorney, Agent, or Firm* — Hauptman Ham, LLP

(57) ABSTRACT

A human-collaborative robot, by which the robot is unlikely to be accidentally operated despite the intention of the human, even if a relatively simple action pattern is determined as a command to the robot. When an external force by a human is applied to the robot, the force is detected by a force sensor. The robot is configured to be stopped when the detected external force exceeds a predetermined threshold. In order to restart the stopped motion of the robot, the human purposely applies the external force to the robot. When a judging section judges that the external force is applied to a specified portion the robot based on a predetermined action pattern, a commanding section commands the robot so that the robot performs a motion which is previously associated with the pattern.

9 Claims, 2 Drawing Sheets

(51) Int. Cl.
  *B25J 19/06* (2006.01)
  *B25J 9/16* (2006.01)
  *G01L 5/00* (2006.01)
  *G01L 5/16* (2020.01)

(52) U.S. Cl.
  CPC ............... *G01L 5/0076* (2013.01); *G01L 5/16* (2013.01); *G05B 2219/40201* (2013.01); *G05B 2219/40202* (2013.01)

(58) Field of Classification Search
  CPC ............ G01L 5/16; G05B 2219/40201; G05B 2219/40202
  USPC ........................................................ 700/253
  See application file for complete search history.

(56) References Cited

U.S. PATENT DOCUMENTS

| | | | | |
|---|---|---|---|---|
| 6,337,552 | B1* | 1/2002 | Inoue | B25J 13/00 |
| | | | | 318/568.1 |
| 6,620,024 | B2* | 9/2003 | Choi | A63H 11/00 |
| | | | | 318/568.2 |
| 9,919,422 | B1* | 3/2018 | Horton | G05B 19/423 |
| 10,011,017 | B2* | 7/2018 | Matsudaira | B25J 13/085 |
| 2013/0226341 | A1* | 8/2013 | Sturm | B25J 5/007 |
| | | | | 700/245 |
| 2015/0177084 | A1 | 6/2015 | Inoue | |
| 2015/0308089 | A1* | 10/2015 | Thompson | G05D 23/1393 |
| | | | | 137/78.1 |
| 2015/0367510 | A1* | 12/2015 | Naitou | B25J 9/1676 |
| | | | | 700/253 |
| 2016/0052128 | A1* | 2/2016 | Zimmermann | B25J 9/1628 |
| | | | | 700/261 |
| 2016/0089790 | A1* | 3/2016 | Wang | B25J 9/1676 |
| | | | | 700/255 |
| 2016/0214261 | A1 | 7/2016 | Davis et al. | |
| 2016/0243705 | A1* | 8/2016 | Naitou | B25J 13/085 |
| 2017/0080886 | A1* | 3/2017 | Kuga | G01S 17/931 |
| 2018/0074475 | A1 | 3/2018 | Schreiber et al. | |

FOREIGN PATENT DOCUMENTS

| | | | | |
|---|---|---|---|---|
| DE | 102015205176 | B3 | 5/2016 | |
| DE | 102016100727 | A1 | 7/2016 | |
| DE | 102015011910 | A1 | 3/2017 | |
| JP | 2001157985 | A * | 6/2001 | |
| JP | 2001-300874 | A | 10/2001 | |
| JP | 2002-18146 | A | 1/2002 | |
| JP | 2002-52489 | A | 2/2002 | |
| JP | 2004-283975 | A | 10/2004 | |
| JP | 2008200764 | A * | 9/2008 | |
| JP | 2008200764 | A | 9/2008 | |
| JP | 2008-229800 | A | 10/2008 | |
| JP | 2011-209103 | A | 10/2011 | |
| JP | 2012-139798 | A | 7/2012 | |
| JP | 2013-94916 | A | 5/2013 | |
| JP | 2015-168040 | A | 9/2015 | |
| JP | 2016-7645 | A | 1/2016 | |
| JP | 2016153156 | A | 8/2016 | |
| WO | WO-2010025944 | A1 * | 3/2010 | ......... B25J 19/0004 |
| WO | WO-2012100397 | A1 * | 8/2012 | ............. F16K 21/00 |

OTHER PUBLICATIONS

Machine Translation of JP2008200764 (Year: 2008).*
Miyazaki et al., "Warm-Hearted Guide Robot Accompanying a User Hand in Hand", ITE Technical Report, Feb. 16, 2013, pp. 55-58, V. 37, No. 7, The Institute of Image Information and Television Engineers, Japan, 5pp.

* cited by examiner

HUMAN-COLLABORATIVE ROBOT

RELATED APPLICATIONS

The present application claims priority of Japanese Application Number 2016-175821 filed Sep. 8, 2016, the disclosure of which is hereby incorporated by reference herein in its entirety.

BACKGROUND OF THE INVENTION

1. Field of the Invention

The present invention relates to a human-collaborative robot, which shares a working area with a human.

2. Description of the Related Art

Recently, a human-collaborative robot, which is operated while sharing a working area with a human, has become popular. In many cases, such a human-collaborative robot has a contact sensor or a force sensor for detecting contact between a human and the robot, and is configured to stop the motion of the robot when the contact is detected so that the robot does not injure the human.

As a relevant prior art document, JP 2008-200764 A discloses a working manipulator including: a movable body such as a robot having a movable part and a control part; and a manipulator part attached to the movable body, the manipulator part having a contact sensor for detecting a contact state between the sensor and an object to be worked, and a force sensor for detecting a contact force at the time of contact. JP 2008-200764 A further recites that the control part has a means for grasping a working state based on the contact state detected by the contact sensor and the contact force detected by the force sensor, and a means for interpreting pattern information as a command, in which the pattern command has an artificial regularity detected by the contact sensor or the force sensor.

Further, there is a well-known technique in which a human purposely applies an external force to a robot so that the robot performs an evacuation motion. For example, JP 2016-153156 A discloses a human-collaborative robot system including: a detecting part configured to detect an external force applied to a robot; an evacuation motion commanding part configured to command an evacuation motion for moving the robot so as to reduce the external force when the external force detected by the detecting part is larger than a first threshold; and a monitoring part configured to stop the evacuation motion when a range of variation of the detected external force in a predetermined period of time after the evacuation motion is commanded is smaller than a second threshold.

In case that the human-collaborative robot is stopped or suspended upon when the robot comes into contact the human, it is necessary to use a means for restarting the robot, in order to restart the operation by the robot. For example, the robot may be restarted by pushing a restart button of an operation panel, whereas the operation panel is not always positioned near the robot. When the restart button is positioned away from the robot, the human (operator) must move to a place where the restart button is positioned, and thus the productivity of the robot may be reduced. On the other hand, in case that the restart button is positioned near the robot, the robot can be rapidly restarted when the robot is stopped, and thus the productivity can be prevented from being reduced. In this case, however, it is necessary that the restart button be arranged separately from the operation panel, and thus it is more costly than the case in which the restart button is positioned on the operation panel.

In the technique of JP 2008-200764 A, the pattern information having the artificial regularity is interpreted as the command, and thus the manipulator(robot) can perform the predetermined motion even if the restart button, etc., is not used. However, in many cases, the sensor used to receive the contact in the human-collaborative robot is configured to detect the contact with respect to the entirety of the robot arm. Therefore, in case that the prior art is applied to the human-collaborative robot, even if the human erroneously applies the force to the robot in a regular pattern, the robot may be restarted despite the intention of the human. For example, in case that the robot is configured to be restarted when the human consecutively knocks the robot twice, the robot may be restarted despite the intention of the human, even if the human erroneously knocks the robot twice consecutively, whereby the human may be exposed to danger.

As a method for solving the above problem, the action pattern to be judged or interpreted as the command of restarting, etc., may be determined as a complicated pattern which is unlikely to be performed accidentally, whereas this method is inconvenient. Therefore, the action pattern is desired to be easily performed.

SUMMARY OF THE INVENTION

Therefore, an object of the present invention is to provide a human-collaborative robot, by which the robot is unlikely to be accidentally operated despite the intention of the human, even if a relatively simple action pattern is determined as a command to the robot.

According to the present invention, there is provided a human-collaborative robot configured to be operated while sharing a working space with a human, the human-collaborative robot comprising: a sensor section configured to, when an external force is applied to the robot, specify a portion of the robot to which the external force is applied; a judging section configured to judge as to whether or not the external force is applied to the robot based on a predetermined pattern, and as to whether or not the portion to which the external force is applied corresponds to a predetermined specified portion of the robot; and a commanding section configured to, when the external force is applied to the robot based on the predetermined pattern and when the portion to which the external force is applied corresponds to the specified portion, command the robot so that the robot performs a motion which is previously associated with the pattern.

In a preferred embodiment, the sensor section may have a six-axes force sensor configured to detect a magnitude and a moment of the external force applied to the robot.

Alternatively, the sensor section may have a contact sensor configured to detect that the human contacts the robot and detect a portion of the robot where the human contacts.

Alternatively, the sensor section may have a torque sensor configured to detect a torque of each axis of the robot.

The pattern may be determined based on at least one of a magnitude and a direction of the external force applied to the robot, and a number of times that the external force is applied to the robot.

BRIEF DESCRIPTION OF THE DRAWINGS

The above and other objects, features and advantages of the present invention will be made more apparent by the following description of the preferred embodiments thereof, with reference to the accompanying drawings, wherein.

DETAILED DESCRIPTIONS

Figure 1:
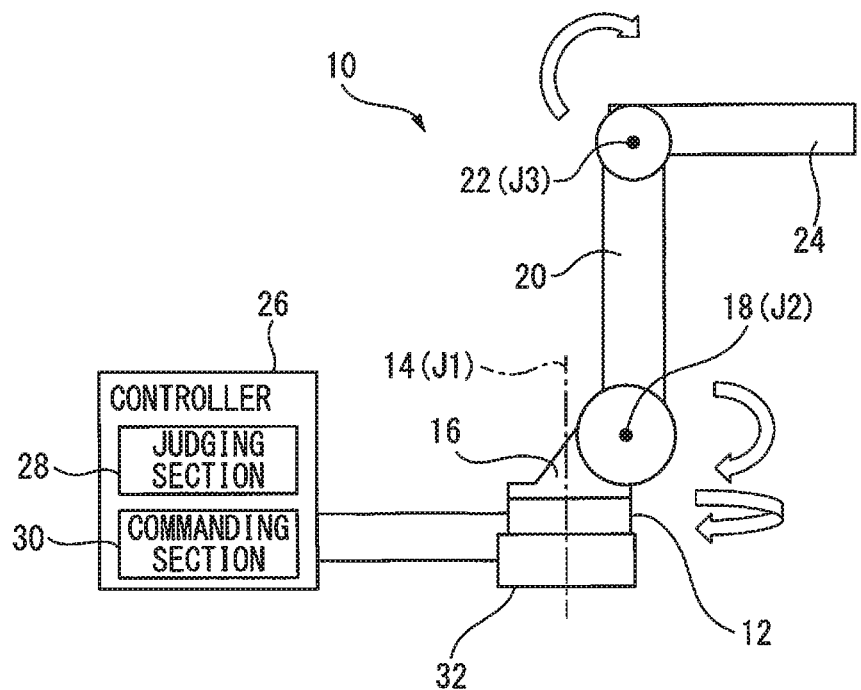
FIG. 1 shows a schematic configuration of a human-collaborative robot according to a first embodiment of the present invention.

FIG. 1 shows a schematic configuration of (a mechanical unit of) a human-collaborative (cooperative) robot 10 according to a first embodiment of the present invention. For example, robot 10 is a vertical multi-joint robot configured to be operated while sharing a working space with a human, and has a base (J1 base) 12, a rotating body (J2 base) 16 arranged on base 12 and rotatable about a first axis (J1 axis) 14, an upper arm (J2 arm) 20 arranged on rotating body 16 and rotatable about a second axis (J2 axis) 18, and a forearm (J3 arm) 24 arranged on a front end of upper arm 20 and rotatable about a third axis (J3 axis) 22.

In robot 10, the front end position of robot 10 can be moved and controlled by rotating the J2 base about the J1 and by rotating the J2 and J3 axes, so as to change the posture of each axis. In the illustrated embodiment, the J2 and J3 axes are rotation axes parallel to each other. Further, a wrist axis (not shown) may be attached to a front end of the J3 arm, and the front end position of the robot may be controlled by the wrist axis.

The motion of robot 10 can be controlled by a robot controller 26 connected to robot 10. As shown in FIG. 1, controller 26 may include a judging section 28 and a commanding section 30, and (the functions of) judging section 28 and commanding section 30 may be realized by a central processing unit (CPU), etc., provided to controller 26. Alternatively, (the functions of) judging section 28 and commanding section 30 may be realized by another device such as a personal computer (not shown), which is arranged separately from controller 26.

Robot 10 has a sensor section 32 attached to a lower part of J1 base 12, and sensor section 32 has a (six-axes) force sensor configured to detect a force and a moment. Hereinafter, the function and motion of robot 10 in the first embodiment will be explained.

When an external force by a human (operator), etc., is applied to robot 10, the force is transmitted to and detected by force sensor 32. Robot 10 is configured to be stopped (in many cases, immediately) for safety purposes, when the detected external force exceeds a predetermined threshold. As such, when the external force larger than the specified value is applied to robot 10 due to the contact between the robot and the human, the human can be prevented from being injured by stopping the robot.

In order to restart the stopped motion of robot 10, the human (operator) purposely applies the external force to the robot. In this regard, judging section 28 judges as to whether the external force is applied to robot 10 based on a predetermined action pattern and as to whether the external force is applied to a specified portion of robot 10. Then, when it is judged that the external force is applied to the specified portion of robot 10 based on the predetermined pattern, commanding section 30 commands robot 10 so that the robot performs a motion (in this case, a restart motion) which is previously associated with the pattern.

For example, it is assumed that a "portion of a lateral side of the robot arm (J2 arm or J3 arm) or the rotating body which is not separated from (an upper end) of the force sensor by 20 cm in the upper direction" is determined as the "specified portion" of robot 10, and "knocking twice consecutively (e.g., within 0.5 second or one second)" is determined as the "predetermined pattern." In this case, when an action that "the portion of the lateral side of the robot arm or the rotating body, which is not separated from of the force sensor by 20 cm in the upper direction, is consecutively knocked twice" is performed by the human, the action of the human may be judged as a command for "restarting the motion of the robot" and then may be executed. By virtue of this, in case that robot 10 is stopped due to the accidental contact between the human and the robot, the motion of robot 10 can be restarted by the simple action by the human, i.e., that the human knocks the lateral side twice which is not separated by 20 cm in the upper direction from force sensor 32.

Figure 2:
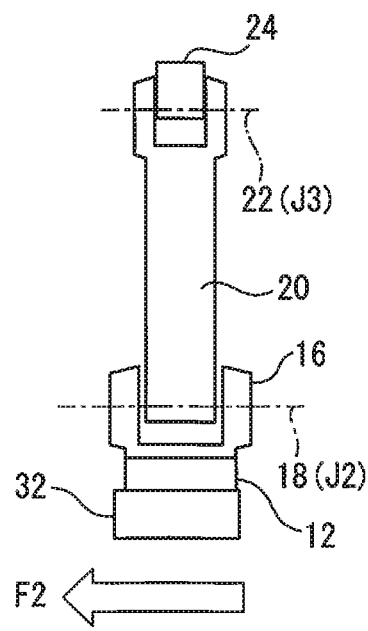
FIG. 2 shows the robot of FIG. 1 viewed from another angle.
Figure 2:

When the six-axes force sensor is used as the sensor section as in the first embodiment, it is difficult to directly detect or specify a position of robot 10 where the external force is applied, whereas the position can be calculated as follows. First, as shown in FIG. 2 in which robot 10 is viewed from the back side (or the left side in FIG. 1), forces (FX, FY, FZ) of three-axes (X, Y, Z) are projected onto the rotation axis of J2, so as to obtain force F2 along J2 axis. Next, moment M2 about a cross product of J1-axis vector and J2-axis vector is obtained from moments (MX, MY, MZ) of the three axes. At this point, a value obtained by dividing M2 by F2 (M2/F2) corresponds to the height of a working point of the force, and thus the working position of the external force can be specified or calculated. In FIG. 2, the direction of force F2 corresponds to a lateral direction parallel to the sheet, and M2 is a moment about the direction perpendicular to the sheet.

In the first embodiment, by virtue of the above process, when the force applied to a portion of robot 10 other than the specified portion (e.g., the front end of the arm) cannot be interpreted as the command. Therefore, only when the external force is applied to the specified portion with the predetermined pattern, such action may be interpreted as the predetermined command (e.g., the motion restarting command) and the robot may be operated based on the command.

Figure 3:
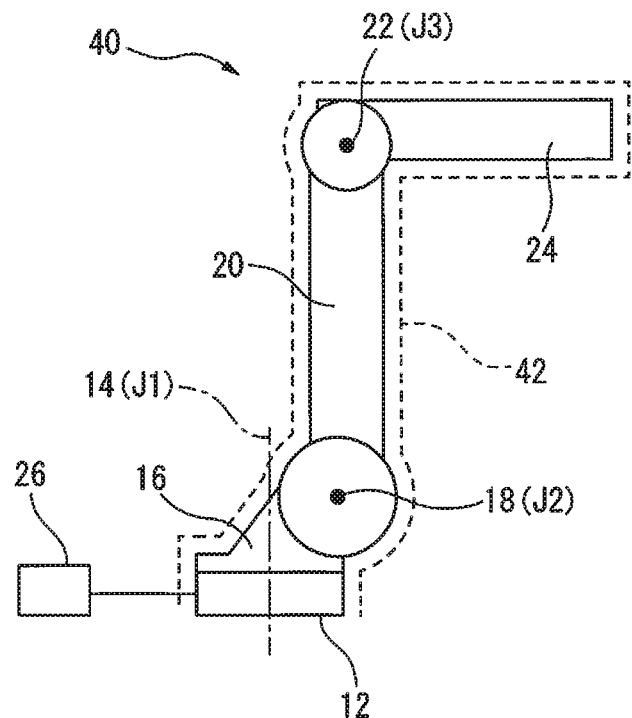
FIG. 3 shows a schematic configuration of a human-collaborative robot according to a second embodiment of the present invention.

FIG. 3 shows a schematic configuration of (a mechanical unit of) a human-collaborative (cooperative) robot 40 according to a second embodiment of the present invention. In the second embodiment, only a subject matter different from the first embodiment will be explained, and therefore, the same reference numerals are added to the components of the second embodiment corresponding to the components of the first embodiment, and detailed explanations thereof will be omitted.

In the second embodiment, the sensor section has a contact sensor 42 configured to detect a contact position, instead of the six-axis force sensor, and robot 40 is covered by contact sensor 42. By using contact sensor 42, it can be judged that the human comes into contact with the robot, and it can be judged which portion of the robot the human comes into contact with. Therefore, it can be directly judged as to whether or not the portion where the human contacts corresponds to the "specified portion" as described above.

In the second embodiment, for example, when the portion of the rotation axis of J3 axis 22 of robot 40 is consecutively knocked twice, this action may be interpreted as the command for restarting the motion of the robot. In such a case, the human can restart the motion of robot 40 by consecutively knocking the portion of the rotation axis of the J3 axis of the robot twice. Therefore, also in the second embodiment, only when the external force is applied to the specified portion with the predetermined pattern, such action may be interpreted as the predetermined command (e.g., the motion restarting command) and the robot may be operated based on the command.

Figure 4:
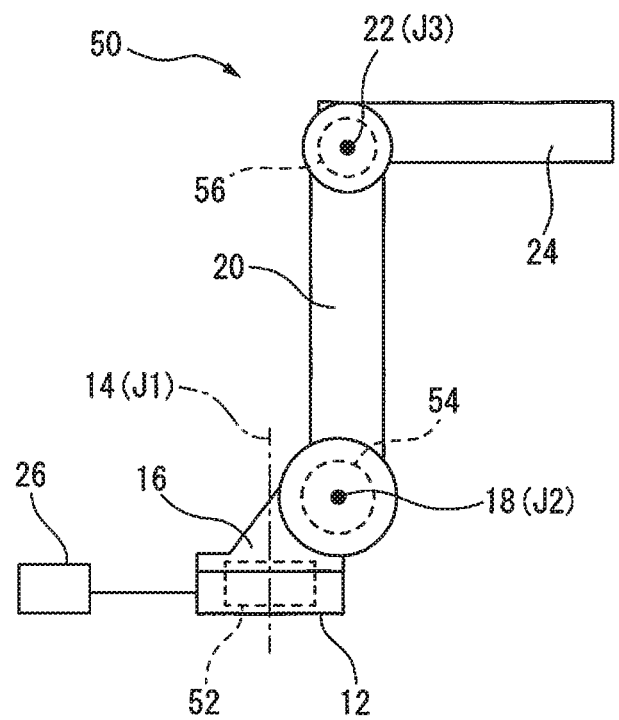
FIG. 4 shows a schematic configuration of a human-collaborative robot according to a third embodiment of the present invention.

FIG. 4 shows a schematic configuration of (a mechanical unit of) a human-collaborative (cooperative) robot 50 according to a third embodiment of the present invention. In the third embodiment, only a subject matter different from the first embodiment will be explained, and therefore, the same reference numerals are added to the components of the third embodiment corresponding to the components of the first embodiment, and detailed explanations thereof will be omitted.

In the third embodiment, the sensor section has torque sensors 52, 54 and 56, instead of the six-axes force sensor. Torque sensors 52, 54 and 56 are provided to the respective axes (in the illustrated embodiment, J1 to J3 axes) of the robot and configured to detect the torque of the corresponding axis. When the human comes into contact with robot 50, at least one of torque sensors 52, 54 and 56 detects the torque due to the external force, and then the motion of robot 50 is stopped or suspended.

In the third embodiment, for example, when J2 arm (upper arm) 20 of robot 50 is consecutively knocked twice, this action may be interpreted as the command for restarting the motion of the robot. In this case, when the human knocks upper arm 20 twice, torque sensor 54 of the J2 axis detects the external force, whereas torque sensor 56 of the J3 axis does not detect the external force. On the other hand, when the human knocks J3 arm (forearm) 24 twice, both torque sensors 54 and 56 detect the external force. As such, the portion to which the external force is applied can be identified based on the detection result of the plural sensors. For example, even when the external force is applied to forearm 24, this action cannot be interpreted as the command. Therefore, also in the third embodiment, only when the external force is applied to the specified portion with the predetermined pattern, such action may be interpreted as the predetermined command (e.g., the motion restarting command) and the robot may be operated based on the command.

The "specified portion" is not limited to the example as described above. For example, the specified portion may be "a lateral side of the robot arm, the height of which from the force sensor (or a reference surface such as an installation surface of the robot) is between 50 cm and 70 cm" may be determined as the "specified portion." In other words, an arbitrary portion of the robot may be determined as the specified portion. In particular, by determining a portion of the robot, to which the external force is hardly applied in normal operation, as the "specified portion," the possibility that the human may accidentally or mistakenly activate or operate the robot can be significantly reduced. In addition, the predetermined "pattern" is not limited to "consecutively knocking the robot twice," etc., and thus the pattern may be determined based on at least one of a magnitude and a direction of the external force applied to the robot, and a number of times (and a time interval if the number is plural) that the external force is applied to the robot. Further, it is preferable that the predetermined pattern be hardly carried out in the normal operation (in other words, the possibility that the pattern is accidentally carried out is considerably low).

In the above embodiment, the command to be executed when the external force is applied to the specified portion of the robot with the predetermined pattern is explained as "restarting the (suspended) motion of the robot." However, the present invention is not limited as such. For example, the robot may be moved to a predetermined waiting position or initial position, or may be operated so as to perform the other evacuating motion. Further, a plurality of patterns may be prepared, so that the robot can perform different motions depending on the patterns. For example, the motion of the robot may be restarted when the robot is consecutively knocked twice, and the robot may be moved to the initial position when the robot is consecutively knocked thrice.

According to the present invention, the action pattern performed against the predetermined specified portion of the robot may be judged as the command so that the robot executes the predetermined motion such as restarting, and the action pattern performed against a portion of the robot other than the specified portion may be ignored. Therefore, the possibility that the robot performs the predetermined motion despite the intention of the human can be significantly reduced.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A robot, comprising:
   a sensor configured to detect an external force applied to the robot; and
   a controller configured to
      calculate, by using the external force, a force in a first direction and a moment about a second direction intersecting the first direction,
      specify, by using the force in the first direction and the moment about the second direction, a portion of the robot to which the external force is applied,
      judge as to whether or not the external force is applied to the robot based on a predetermined pattern, and as to whether or not the portion of the robot to which the external force is applied corresponds to a predetermined specified portion of the robot,
      command the robot, when the external force is applied to the robot based on the predetermined pattern and when the portion to which the external force is applied corresponds to the predetermined specified portion, so that the robot performs a motion which is previously associated with the predetermined pattern, and
      command the robot to stop when the external force applied to the robot exceeds a predetermined threshold,
   wherein the predetermined pattern includes restarting the robot after the robot has been stopped or shutdown.

2. The robot as set forth in claim 1, wherein the sensor comprises a six-axis force sensor.

3. The robot as set forth in claim 1, wherein the robot has a rotation axis,
the first direction is an axial direction of the rotation axis, and the second direction is a direction intersecting the axial direction.

4. The robot as set forth in claim 1, wherein the robot is a human-collaborative robot configured to be operated while sharing a working space with a human.

5. A robot, comprising:
a sensor configured to detect an external force applied to the robot; and
a controller configured to:
calculate, by using the external force, a force in a predetermined direction,
judge, by using the force in the predetermined direction, as to whether or not a portion of the robot to which the external force is applied corresponds to a predetermined specified portion,
judge as to whether or not the external force is applied to the robot based on a predetermined pattern,
command the robot, when the external force is applied to the robot based on the predetermined pattern and when the portion to which the external force is applied corresponds to the predetermined specified portion, so that the robot performs a motion which is previously associated with the predetermined pattern, and
command the robot to stop when the external force applied to the robot exceeds a predetermined threshold,
wherein the predetermined pattern includes restarting the robot after the robot has been stopped or shutdown.

6. The robot as set forth in claim 5, wherein the sensor comprises a six-axis force sensor.

7. The robot as set forth in claim 5, wherein the robot is a human-collaborative robot configured to be operated while sharing a working space with a human.

8. The robot as set forth in claim 1, wherein after the robot is stopped, the controller is further configured to command the robot to restart when the external force is applied to the robot based on the predetermined pattern and when the portion to which the external force is applied corresponds to the predetermined specified portion.

9. A robot, comprising:
at least two sensors respectively provided to a plurality of axes of the robot and configured to detect an external force about the respective axes; and
a controller configured to
calculate, by using the external force detected by the sensors, a force in a first direction and a moment about a second direction intersecting the first direction,
specify, by using the force in the first direction and the moment about the second direction, a portion of the robot to which the external force is applied,
judge as to whether or not the external force is applied to the robot based on a predetermined pattern, and as to whether or not the portion of the robot to which the external force is applied corresponds to a predetermined specified portion of the robot, and
command the robot, when the external force is applied to the robot based on the predetermined pattern, and when the portion to which the external force is applied corresponds to the predetermined specified portion, so that the robot performs a motion which is previously associated with the predetermined pattern,
wherein the predetermined pattern includes restarting the robot after the robot has been stopped or shutdown.

* * * * *